UNITED STATES PATENT OFFICE.

HERMANN MEHNER, OF BERLIN, GERMANY.

ARTIFICIAL FERTILIZER.

SPECIFICATION forming part of Letters Patent No. 649,941, dated May 22, 1900.

Application filed December 1, 1897. Serial No. 660,434. (No specimens.)

*To all whom it may concern:*

Be it known that I, HERMANN MEHNER, doctor of philosophy, a subject of the King of Saxony, and a resident at 7 Körnerstrasse, Berlin W. 35, in the Kingdom of Prussia, German Empire, have invented a new and useful Artificial Fertilizer, (for which I have obtained patents in Germany, No. 87,498, dated June 15, 1895; in Great Britain, No. 12,470, dated June 27, 1895; in France, No. 254,294, dated February 26, 1896, and in Belgium, No. 120,047, dated February 26, 1896;) and I do hereby declare that the following is a full, clear, and exact description of the invention, which will enable others skilled in the art to which it appertains to make and use the same.

This invention relates to the fertilizing of the soil with nitrogen in the form of inorganic nitrogen compounds; and it contemplates the provision of the nitrogen in the soil in such a form as will enable the same to become efficient as a gradually and uniformly supplying ammonia-producer.

To this end the present invention consists in providing for in the soil silicon compounds of that class of inorganic nitrogen compounds which are comprised under the term "nitrides."

A well-known defect in the customary method of fertilizing by the aid of nitrogenous manure consists in the fact that the nitrogen compounds available for this purpose at the present time form easily-soluble salts, in consequence of which they not only last but a short time in the soil, and therefore render the supply of nitrogen to the plant very irregular, but are also liable to be withdrawn from the same by the action of the weather. In some cases the nitrogenous manure is even entirely lost if the plants meet with some mishap during the period of vegetation. I have found that these inconveniences are perfectly done away with by the nitrogen being incorporated in the soil, instead of in the usual form as ammonia salts or nitrates, in the form of those compounds which it forms with the element silicon and which are scientifically termed as "nitrides."

As known, silicon nitrides are obtained by exposing silicon to the action of free nitrogen in the presence of very high temperatures. They yield ammonia upon being heated up to a red heat in a current of steam. Silicon nitrides are only mentioned in scientific literature, and no attempts have been made as yet to make them available for practical purposes, owing to the difficulty of preparing them.

My systematic experiments with regard to the use of silicon nitride as a fertilizer have, moreover, shown that under the action of a weak solution of carbonic acid it undergoes a slow decomposition, whereby its nitrogen is converted into ammonia. The same effect is also produced by other weak acids. As these reagents exist in the soil moisture, the use of silicon nitride as a manure not only permits of the generation of ammonia being transferred from the chemical works into the soil itself, but guarantees to the plant a lasting and uniform supply of nitrogen. The silicic acid or silicates resulting from the decomposition are uninjurious to the plants. The same holds good for compounded silicon nitrides, such as silicon-magnesium nitrides. Hence the term "silicon nitrides" as used in the specification is to be understood as comprising single as well as compounded silicon nitrides.

It is not necessary to employ the single or compounded silicon nitrides alone. Under certain circumstances it may be deemed expedient to mix them with other substances on condition that these will not expel ammonia. For instance, the farmer may introduce the new manure into the soil as a mixture with sulphates, which he otherwise also requires—say with kainite—in order to save labor. The supply of nitrogen in the form of silicon nitrides has, on the other hand, the enormous additional advantage of cheapening the manuring by reducing the cost of transport. In one hundred kilograms of the concentrated nitrogenous manure in the form of Chili saltpeter there are only fifteen kilograms and in the form of ammonium sulphate only ten kilograms, whereas silicon nitrates contain more than double the quantity of nitrogen.

As according to my improved process atmospheric air or producer-gas is utilized for manufacturing silicon nitrides, the use of the latter as fertilizer constitutes a method of manuring with atmospheric nitrogen. As compared with the well-known method of manuring with lupines and the like, the advantages are at once manifest; but also as compared with any other method—for instance, that of converting the atmospheric nitrogen into the ammonium sulphate used—the great advantage of the direct employment of the silicon nitrides will be recognized. The sulphuric acid combined with fourteen parts, by weight, of nitrogen amounts to about fifty parts, by weight. These fifty parts, by weight, of sulphuric acid must be specially manufactured. The carriage alone of the iron pyrites—to be obtained from distant places, partly from Spain—for producing the acid amounts to more than the total cost of the sands to be found everywhere and of the quartz.

What I claim as my invention is—

As an article of manufacture, an artificial fertilizer containing as an essential ingredient silicon nitrides, said nitrides forming with the acid reagents in the soil, ammonia, substantially as described.

In testimony whereof I have hereunto set my hand in the presence of two subscribing witnesses.

HERMANN MEHNER.

Witnesses:
WOLDEMAR HAUPT,
HENRY HASPER.